INVENTORS
VINCENT J. KORKOWSKI
FRANCIS J. BELCOURT
RAYMOND H. JAMES
BY Griffin and Stokes
ATTORNEYS

DETECTOR SYSTEM AND DEVICE

Filed July 24, 1964

United States Patent Office 3,427,601

Patented Feb. 11, 1969

3,427,601

DETECTOR SYSTEM AND DEVICE

Vincent J. Korkowski, Minneapolis, Francis J. Belcourt, Shakopee, and Raymond H. James, Bloomington, Minn., assignors to Sperry Rand Corporation, New York, N.Y., a corporation of Delaware Filed July 24, 1964, Ser. No. 384,885

U.S. Cl. 340—174 16 Claims

Int. Cl. G11b 5/00

ABSTRACT OF THE DISCLOSURE

A search memory employing a semiconductor detecting circuit. The detecting circuit comprises two semiconductors having first electrodes connected in common and second electrodes connected to a current return path. A capacitor is connected between said first electrodes and the return path and a switch and voltage source are provided for selectively charging the capacitor. Control signals may be selectively applied to third electrodes of the semiconductors. Upon receipt of a control signal a semiconductor fires and the capacitor discharges. Further control signals to either semiconductor have no effect unless the capacitor is first recharged. Magnetic cores inductively coupled to the return paths from the second electrodes develop the output signals.

The present invention broadly relates to a novel search memory configuration, and more particularly, to a transistorized detecting circuit having a plurality of signal input leads for detecting that input lead upon which first occurs a significant signal, and which circuit thereafter automatically ignores later appearing signals on the same or other input leads.

Some data processing operations require that the first signal appearing on any one of a plurality of electrical conductors be detected and remembered to the exclusion of signals subsequently appearing on the same or others of said plurality. A device for doing this is extremely useful as a word match logic circuit for certain search memory applications, although its usefulness extends beyond such environments. The present invention contemplates a novel circuit of this nature which is comprised of a plurality of high power gain semiconductor elements which share a common capacitor, wherein the first semiconductor element to conduct by the application of an input signal thereto provides a discharge path for the common capacitor to thereafter effect a lock out condition to the other element input signals subsequently applied thereto. This novel circuit is readily incorporated into a search memory configuration to provide a novel combination adaptable to equality, greater-than, and less-than modes of search. The invention is relatively inexpensive since fewer components are required than prior art match logic detectors which heretofore have provided this function. Furthermore, the circuit is compatible with conventional encoder systems since the use of magnetic cores in the semiconductor output circuits provides an easy way to couple output information to address generators used in the search memory system.

Therefore, one object of the present invention is to provide a novel semiconductor detector for indicating and remembering the first appearing one of a plurality of signals on separate conductors.

Another object of the present invention is to provide a match logic detector for search memory applications which has high power gain capable of detecting signals less than 50 millivolts.

A third object of the present invention is to provide a circuit incorporating at least two high power gain semiconductor elements whose collectors are connected in common to a single capacitor which in turn is initially charged to provide the reverse collector voltage for said elements.

Figures 1, 2, 3:
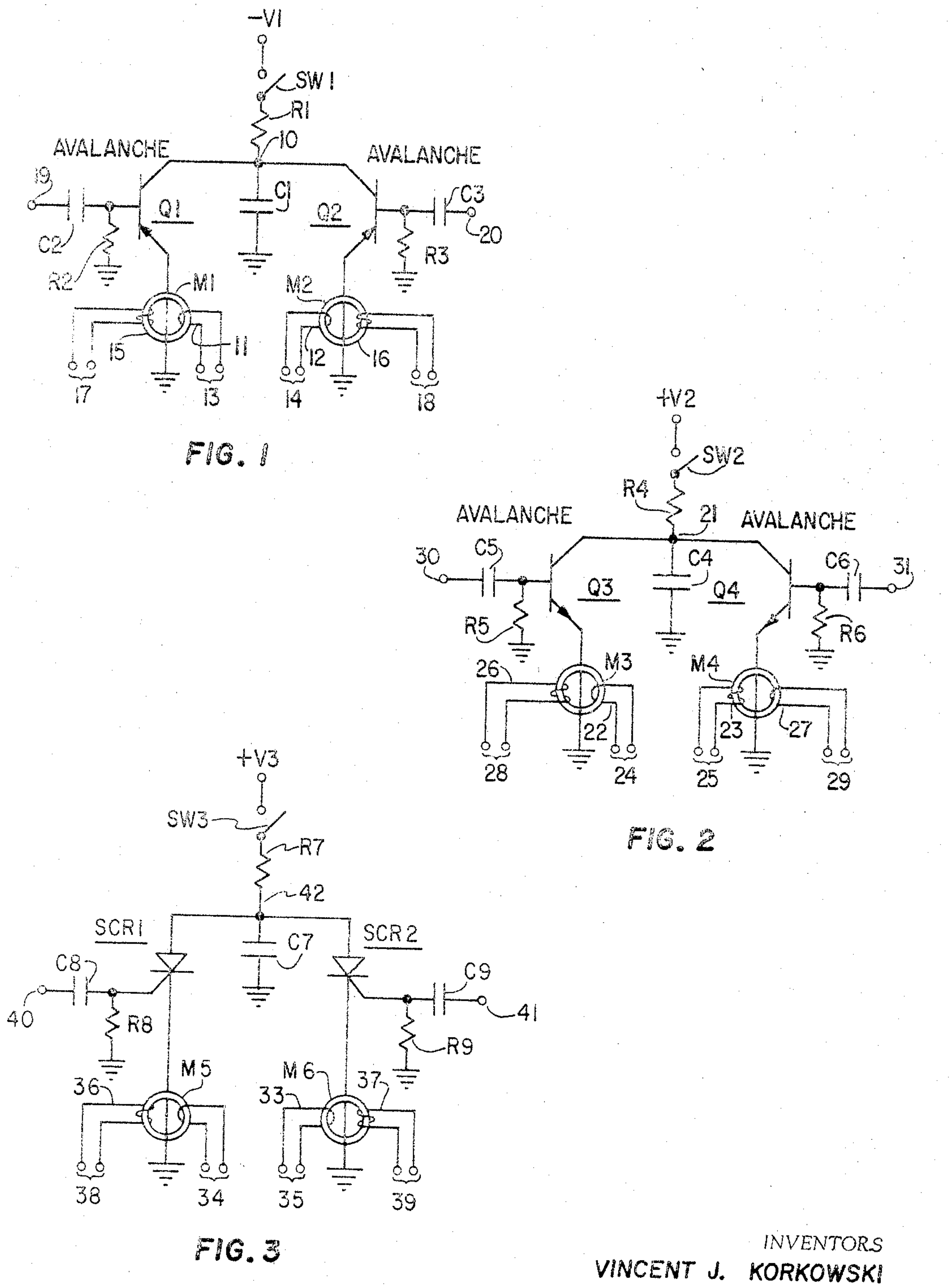
Figure 4:
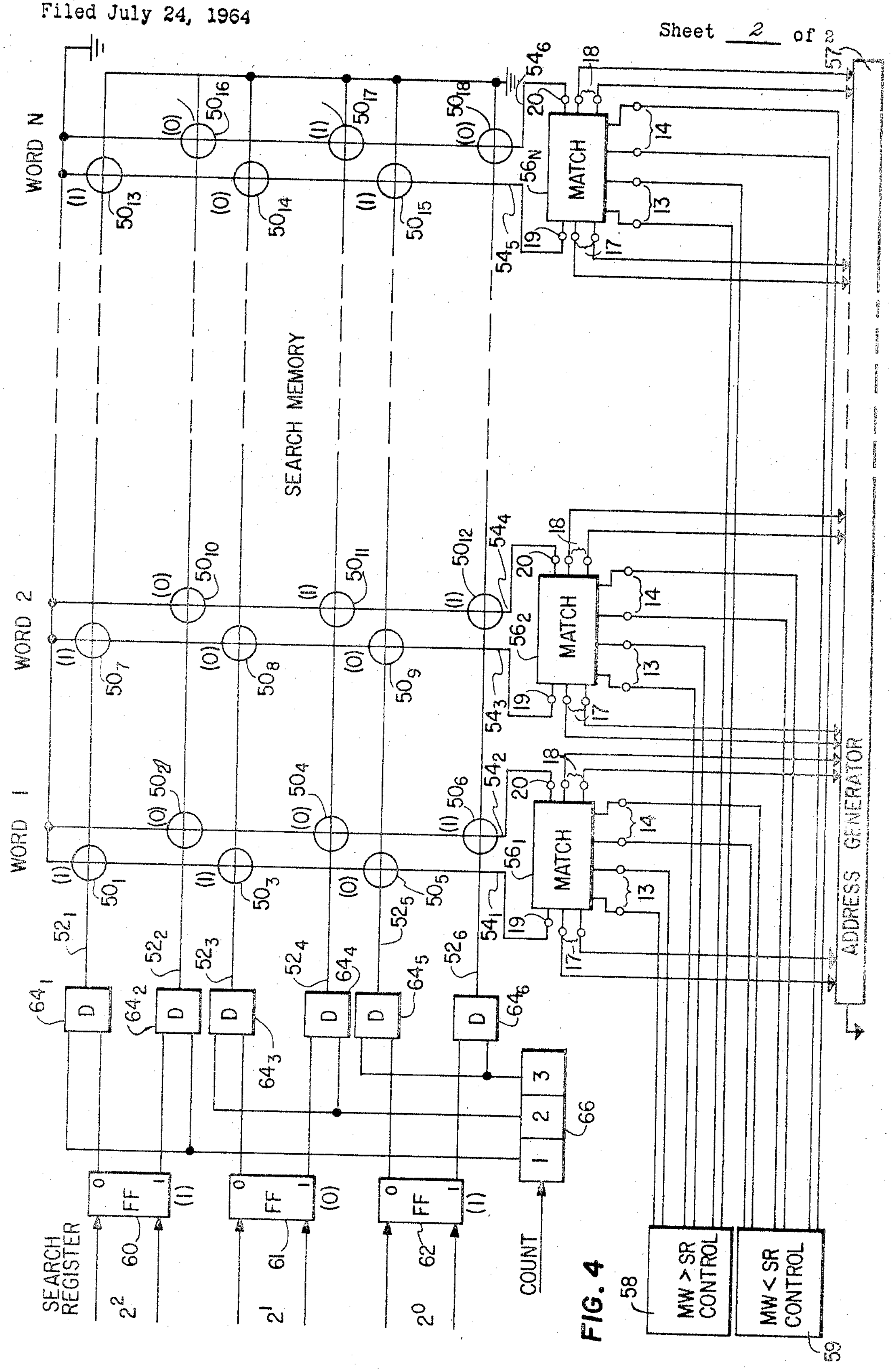

These and other objects of the invention will become apparent during the course of the following description to be read in view of the drawings, in which:

FIGURE 1 illustrates a first embodiment of the basic novel logic detector which employs PNP avalanche transistors as the high power gain semiconductor elements;

FIGURE 2 discloses a second embodiment of the basic circuit which employs NPN avalanche transistors;

FIGURE 3 discloses a third embodiment of the basic logic circuit which employs silicon controlled rectifiers (SCR) as the high gain semiconductor elements; and FIGURE 4 shows a novel combination of the basic detector circuit connected in a search memory configuration which affords several different search modes on a data word.

The various embodiments of the basic semiconductor detecting circuit of FIGURES 1, 2, and 3 will first be described before discussing its incorporation into a search memory.

FIGURE 1 shows two PNP transistors Q1 and Q2 whose collector electrodes are connected in common to one side of a capacitor C1 at junction point 10. Each transistor Q1 and Q2 is of the avalanche type and thus exhibits a high power gain characteristic which is desirable when the inputs thereto are derived from a search memory matrix made up, for example, of magnetic thin film element. An avalanche transistor generally may be defined as a special junction unit whose collector-base junction is biased with a reverse field large enough so that when the emitter-base junction is forward biased, the carriers which traverse the collector-base junction are accelerated to such an extent that they collide with atoms in the crystal structure and thereby release additional free carriers. Consequently, this avalanche phenomenon makes the current gain of the junction device greater than one which in turn provides a high power gain characteristic. The other terminal of capacitor C1 is connected to a reference potential shown here to be circuit ground. A series circuit comprised of resistor R1 and switch SW1 is connected between junction 10 and a source of negative biasing potential V1. The polarity of source V1 is such as to reverse bias the collector-base junction of each transistor, and its magnitude should be just below the breakdown (avalanche) point required to put the transistors into conduction. Switch SW1 may be selectively open or closed either by manual means or by automatic circuit control means not shown herein.

The emitters of transistors Q1 and Q2 are both connected to a return path, here circuit ground, so as to complete the collector-emitter current loop. In order to remember a previous condition of current flow in either one of these emitter-collector paths, memory means are provided individual to each transistor and which preferably are in the form of bistable ferro-magnetic cores M1 and M2 which are threaded by the respective emitter conductors of transistors Q1 and Q2. Each of these magnetic cores generally has a square hysteresis loop. For cores M1 and M2 are provided respective interrogate drive windings 11 and 12 which in turn can each be connected by respective pairs of terminals 13 and 14 to appropriate control circuits. These cores further have respective readout windings 15 and 16 on each of which appears an active induced signal voltage whenever the flux condition of the core is reversed. These readout windings may be selectively connected to appropriate utilization means by respective pairs of terminals 17 and 18.

The base electrode of transistor Q1 can receive a first control input signal, via input terminal 19, coupling capacitor C2, and resistor R2, which is of negative going polarity so as to place Q1 into conduction. Terminal 20, capacitor C3 and resistor R3 likewise provide an input network for a second selectively applied negative going control signal to the base electrode of transistor Q2. Thus, the operation of the FIGURE 1 circuit is as follows. Switch SW1 is first closed so that capacitor C1 charges via R1 to the negative V1 potential. Voltage V1 is then removed from the circuit by opening switch SW1. In this condition, the first application of a negative trigger pulse to either input terminal 19 or 20 sets or fires the corresponding transistor Q1 or Q2 into conduction and rapidly discharges capacitor C1 through the collector-emitter current path of said fired transistor. The current flow through the emitter electrode conductor switches the flux in the associated core M1 or M2 into a particular remanent direction where it subsequently remains after termination of said emitter current. Once capacitor C1 has been discharged through the first transistor to be fired, subsequent input signals regardless of the input terminal to which they are applied have no further effect on the circuit since the reverse biasing collector potential necessary for transistor operation has now been dissipated. Consequently, the circuit is effectively "locked out" until such time as the charging voltage V1 is once again applied to capacitor C1 by a subsequent closing of switch SW1 at the beginning of a new detecting cycle. Prior to the next closing of switch SW1, however, magnetic cores M1 and M2 can be interrogated by a current of appropriate polarity in drive windings 11 and 12 in order to determine their states. The circuit, therefore, provides a stored memory indication of that input terminal 19 or 20 to which was first applied a negative going signal, regardless of the number of negative going signals which may subsequently be applied to either input terminal before the cycle is terminated.

FIGURE 2 shows a slight modification of FIGURE 1 merely in the use of NPN avalanche transistors Q3 and Q4, rather than the PNP type. A positive collector voltage V2 is selectively applied in order to charge capacitor C4 and so reverse bias the collector-base junction of each transistor, and a positive going control signal pulse is required at the base electrode of a transistor for conduction therethrough to occur. Otherwise, the remaining components of FIGURE 2 have identical functions to the corresponding components in FIGURE 1, and it is believed that no detailed description need further be given of this second embodiment.

FIGURE 3 shows a third embodiment of the basic detecting circuit which employs two silicon controlled rectifiers SCR1 and SCR2 for providing high power gain upon being triggered. These silicon controlled rectifiers are connected by their anodes to junction 42 which is intermediate capacitor C7 and resistor R7. Switch SW3 is temporarily closed to initially apply the charging voltage V3 to capacitor C3 which is thereafter discharged by the first SCR to be fired in response to a signal applied to its control electrode. The signal input circuits comprised of capacitors C8, C9, resistors R8 and R9, and the magnetic cores M5 and M6 find their full equivalents in the circuits of FIGURES 1 and 2 previously described.

Although only two semiconductor switch elements have been shown in each basic circuit discussed so far, additional elements may be employed depending upon the number of lines to be detected, with each additional element operating from the same common capacitor so as to effect lockout of the circuit upon being fired. However, as has been mentioned in the beginning paragraphs of this specification, one particular novel use for the basic circuits shown in FIGURES 1, 2 and 3, is as a word match logic circuit in a search memory. FIGURE 4 shows such a novel combination which forms part of the present invention. A search memory matrix for use with the basic circuit is comprised of a plurality of bistable storage elements 50 which preferably, but not necessarily, are thin magnetic film core elements of the type disclosed in U.S. Patents 3,015,807 and 3,125,743, to name but a few. However, elements 50 may be magnetic ferrite torroids or any other element in which a binary digit (bit) value can be stored and then driven to the opposite value upon interrogation thereof. Elements 50 are arranged in a plurality of data word storage columns, with each word column providing an individual element for each of the true and complement values of every binary digit in the word. Only a three bit word length is shown in FIGURE 4, but this may obviously be expanded. Thus, in the Word 1 column of FIGURE 4, element 50$_1$ is provided to store the true value of the highest order binary digit of the word. while element 50$_2$ stores the complement value of said highest order bit. Elements 50$_3$ and 50$_4$ respectively store the true and complement values of the next highest order bit of Word 1, and elements 50$_5$ and 50$_6$ respectively store the true and complement values of the lowest order bit of said word. The Word 2 through Word N columns likewise have their elements 50 arranged in similar pattern.

The search memory has rows of digit drive windings 52 each inductively coupled with corresponding elements 50 in the same row of each word column. Drive winding 52$_1$, for example, is coupled with that element 50 (50$_1$, 50$_7$ . . . 50$_{13}$) in each word column which contains the true value of the highest order binary digit. Likewise, drive winding 52$_2$ is inductively coupled with those elements 50$_2$, 50$_{10}$ . . . 50$_{16}$ in the word columns which contain the complement values of said highest order binary digits. The remaining drive windings 52$_3$ to 52$_6$ are also respectively inductively coupled with elements containing the true and complement values of the remaining binary digits of the word. The search memory further has a set of word sense windings 54 which are arranged in columns and are inductively coupled with those elements in the same column containing either all true or all complementary values of the binary digits of the stored word therein. Sense winding 54$_1$ is therefore inductively coupled with elements 50$_1$, 50$_3$, and 50$_5$ all of which contain true values of the binary digits in Word 2. Sense winding 54$_2$ is inductively coupled with elements 50$_2$, 50$_4$, and 50$_6$ which contain the complement values of the bits in Word 1. The remaining sense windings 54$_3$, 54$_4$, etc. likewise bear the same relationship to their respective column elements.

One purpose of search memory operation is to identify the location of words held therein which meets some particular search criterion, usually expressed as a determination of the relative magnitude of a stored data word with an external search word. Thus, a search register comprised of flip-flops 60, 61, and 62 is provided to hold a three bit search word. The particular object of the configuration in FIGURE 4 is to determine the exact column location of words stored in elements 50 which are numerically either greater than or less than the three bit search word held in the search register. A search is also made for equality between the search register word and words in the search memory. The mode of operation consists in interrogating the element 50 matrix, row by row, beginning with those rows which store the true and complement values of the highest order binary digit. The true digit winding 52 for any given binary digit order is driven or pulsed with current only if the search register bt of corresponding order is a binary 0, whereas the complement digit winding 52 for said given binary digit order is driven only when the corresponding order search register bit is a binary 1. The digit windings 52 are so intercoupled with their respective elements 50 that if pulsed or driven with current, all elements 50 coupled therewith are driven to a flux condition representative of a 0 digit. Thus, any element 50 initially having a flux condition representative of a binary 1 value is reversed to a binary 0 flux condition and in so doing, induces an active output signal voltage on its associated word sense winding 54. On the other hand, any element 50 already in a binary 0 flux condition will not be changed when its drive winding is pulsed with current, so as to avoid inducing any output signal on its associated word sense winding 54.

A set of digit winding drivers 64 are provided, one for each digit drive winding 52, with each said driver 64 producing current in its associated drive winding of polarity which tends to drive each element 50 inductively coupled therewith to a binary 0 flux condition. Each digit driver 64 requires the concurrent application of two input signals thereto in order to be energized. One of said two signals is provided by the bit value in the search register, while the other signal is provided from a step counter 66 used to sequentially search the various rows of the search memory from the highest to the lowest order binary digit. Thus, digit drive winding $52_1$, which is associated with the elements $50_1$ $50_7$, etc. containing the true values of the highest order binary digits in the various words, is connected to driver $64_1$. Driver $64_1$ in turn is energized only by the presence of a binary 0 value in flip-flop 60 as well as an output from stage 1 of counter 66. Drive winding $52_2$, which is coupled with elements $50_2$, $50_{10}$, etc. containing the complement values of the highest order binary digits in the memory words is connected to driver $64_2$ which in turn is energized by a binary 1 value in flip-flop 60 in the presence of the output from stage 1 of counter 66. When counter 66 is stepped to stage 2, only one of the drivers $64_3$ or $64_4$ is permitted to be energized according to the value of the binary bit stored in flip-flop 61. Thus, driver $64_3$ is energized, if said binary value is 0, in order to pulse drive line $52_3$ coupled with those elements 50 containing the true values of the next highest order word binary digits. On the other hand, driver $64_4$ is energized if the binary value in search register flip-flop 61 is 1, whereupon digit winding $52_4$ is driven to interrogate those elements 50 which contain the complement values of said next highest order binary digits in the memory words. Finally, when counter 66 steps to stage 3 thereof, one of the two digit drivers $64_5$ or $64_6$ is energized according to the binary value held in flip-flop 62 of the search register. Driver $64_5$ is connected to drive winding $52_5$ which interrogates elements 50 containing the true values of the lowest order binary digits, whereas driver $64_6$ is connected to digit winding $52_6$ used for interrogating elements 50 containing the complement values of the lowest order binary digits.

Each word column further has an individual match circuit 56 which may be any one of the embodiments shown in FIGURES 1, 2, or 3. For the purpose of describing FIGURE 4, the circuit in FIGURE 1 is assumed as being used therein. One signal input to each column match circuit is provided by the true sense winding from its associated column, while the other input is provided by the complement sense winding. Thus, in the Word 1 column, sense winding $54_1$ is connected to terminal 19 of the match circuit which in turn leads to transistor Q1 therein. The complement sense winding $54_2$ is connected to match circuit input terminal 20 so as to energize transistor $Q_2$ therein. The remaining match circuits 56 likewise are connected with their respective column true and complement sense windings in an identical manner. The magnetic core output terminals 17 and 18 from each match circuit are connected to some form of address generator means 57 so that a different number may be generated for each word column in the event that a match is found with the word located therein. All of the match circuit input terminals 13 (used to interrogate cores M1) are connected to a control unit 58 labelled *MW>SR* which is operated whenever it must be determined whether any word stored in elements 50 is greater than the search register word. In similar fashion, input terminals 14 of each match circuit are connected to another control unit 59 (*MW<SR*) which is operated when it is desired to determine if any word in memory is less than the search register word.

In order to described the entire operation of the search memory system in FIGURE 4, it is now assumed that the three bit word held in search register flip-flops 60, 61, 62 has a binary digit value of 101 (decimal 5), respectively, as indicated by the number in the parenthesis placed next to each said flip-flop. Word 1 held in the search memory is also assumed to have true bit values of 110 (decimal 6) as respectively stored in respective elements $50_2$, $50_4$, and $50_6$. Search memory word 2 is assumed to have true bit values of 100 (decimal 4) as respectively stored in elements $50_7$, $50_8$, and $50_9$, whose complement values are 011 stored in respective elements $50_{10}$, $50_{11}$, and $50_{12}$. The last word N in the search memory is assumed to be numerically equal to the search register word, such that true value bits 101 are stored in respective elements $50_{13}$, $50_{14}$, and $50_{15}$, with its complement bit values 010 being stored in respective elements $50_{16}$, $50_{17}$, and $50_{18}$.

The first steps of the search memory operation include the closing of switch SW1 in each match circuit 56 in order to charge the capacitors C1 to the reverse bias potential V1, and the resetting of all cores M1 and M2, by appropriate current pulses from units 58 and 59, to a flux state opposite to the state caused by the firing of either transistor. The switches SW1 are then opened and counter 66 has its stage 1 placed in operation. Since flip-flop 60 contains a binary 1, only driver $64_2$ is energized at this time to drive elements $50_2$, $50_{10}$, and $50_{16}$ to a binary 0 flux condition. However, since each of the aforesaid elements 50 already stores a binary 0, there is no significant flux change which would induce voltage outputs on any of the respective word sense windings $54_2$, $54_4$, or $54_6$. At the conclustion of this first search on the highest order bits, therefore, no transistor Q1 or Q2 in any of the match circuits $56_1$, $56_2$, or $56_N$ has been fired.

Counter 66 is next stepped to stage 2. Since the search register flip-flop 61 contains a binary 0 value, driver $64_3$ pulses drive winding $52_3$. Elements $50_8$ and $50_{14}$ do not have their flux conditions changed since they are already storing binary 0 values, hence no signals are induced on output sense windings $54_3$ or $54_5$. On the other hand, element $50_3$ stores a binary 1 value which is now changed to a binary 0 because of the current in drive winding $52_3$. This induces a significant negative going signal in sense winding $54_1$ which, when applied to match circuit $56_1$, fires transistor Q1 therein. Consequently, capacitor C1 of said match circuit $56_1$ is discharged to now drive core M1 therein to the opposite flux condition. The discharge of C1 through Q1 in circuit $56_1$ also prevents either transistor Q1 or Q2 therein from being energized during any subsequent row search.

The final search comes when counter 66 is stepped to stage 3 and driver $64_6$ becomes energized because of the binary 1 value in flip-flop 62. Current in drive winding $52_6$ does not cause any flux change in element $50_{18}$ in Word N column. Flux changes do occur in elements $50_6$ and $50_{12}$ since each stores a binary 1 value which is now changed to binary 0. Consequently, both sense windings $54_2$ and $54_5$ have signals induced therein which are applied to terminals 20 of respective match circuits $56_1$ and $56_2$. In match circuit $56_1$, however, transistor Q2 is unable to fire because capacitor C1 has by this time depleted its charge as caused by the firing of Q1 during the previous row search. Capacitor C1 still retains its charge in match circuit $56_2$ so that Q2 therein is energized and drives core M2 into its opposite flux condition. Consequently, at the end of all row searches it is seen that core M1 in match circuit $56_1$ has had a reversal of flux as has had core M2 in match circuit $56_2$. In match circuit $56_N$ there has never been a firing of either transistor Q1 or Q2 so that both cores M1 and M2 therein remain in their original reset flux condition. This particular state of M1 in match circuit $56_1$ therefore indicates that Word 1 is numerically greater than the search register word, while the condition of M2 in match circuit $56_2$ indicates that Word 2 is numerically less than said search register word. Match circuit $56_N$, however, indicates by its undisturbed cores M1 and M2 that Word N is numerically equal to the search register word. The match circuits 56 are now pulsed by the control circuits 58 and 59 in order to reset all cores M1 and M2 to their pre-search condition. This operation changes the flux conditions of only core M1 in match circuit $56_1$, and only core M2 in match circuit $56_2$. Consequently, output signals are derived from terminals 17 of the former and terminals 18 of the latter which are directed to the address generator for providing coded information indicative of the location of those words greater than and less than the search register word, If neither core M1 or M2 in a match circuit were switched during the matrix row searches, then appropriate circuits can be devised, if desired, which generate an active signal indication in response to the absence of signals from terminals 17 and 18 when units 58 and 59 are in operation.

In any of the FIGURE 1, 2 or 3 circuits, the control switch SW could be eliminated and potential V permanently connected to the circuit if the RC charge time is substantially greater than the time required to ripple through the rows in the search memory matrix of FIGURE 4. That is to say, the time constant $R_1C_1$ (when using FIGURE 1) would be greater than the time required to serially interrogate all bits of the entire memory word. For example, if the interrogation of either conductor $52_1$ or $52_2$ causes an output signal on either conductor $54_1$ or $54_2$, the capacitor C1 is discharged through a transistor. However, the magnetic core elements M1 and M2 are not interrogated until after the interrogation of lines $52_5$ or $52_6$. In the meantime, the capacitor should not be recharged back up to an effective reverse biasing potential until such time as the interrogation of the word is completed, since the discharge lock-out must be effective between the time when a transistor is first fired in a match circuit and the time that the last and final bit of the word is interrogated. Furthermore, the impedance of the current conducting path through any fired transistor should obviously be substantially less than the charging path of the capacitor $C_1$ in order for said capacitor to discharge even though the potential source V1 is still physically connected thereto. With these two criteria in mind, it can therefore be seen that switch SW can be eliminated in certain environments. Thus, while several preferred embodiments of the invention have been shown and described, modifications thereto will be apparent to those skilled in the art without departure from the novel principles defined in the appended claims.

The embodiments of the invention in which an exclusive property or privilege is claimed are defined as follows:

1. A detector circuit comprising:

(a) at least two high power gain semiconductor elements each with an asymmetrical current conducting path therein between first and second electrodes thereof and having a third electrode responsive to an applied control signal for at least initiating current flow in said current conduction path;

(b) electric charge storing means connected in common between the said first electrode of each said semiconductor element and a circuit return path;

(c) means connecting said second electrode of each said semiconductor element with said circuit return path;

(d) a charging circuit operatively connectable in selective fashion to said charge storing means for giving the latter an electric charge of a polarity and magnitude to thereby permit current conduction in the current conduction path of any said semiconductor element when a control signal is applied to its third electrode said electric charge changing to a magnitude insufficient to permit current conduction in any other semiconductor element once a control signal is applied to any one of said third electrodes; and (e) means for selectively and individually applying control signals to said third electrodes.

2. A circuit according to claim 1 wherein said charging circuit includes at least a potential source and a switch connected in series across said charge storing means.

3. A circuit according to claim 1 wherein said charging circuit includes at least a potential source and an impedance element, the latter being subsantially larger than the impedance of any semiconductor element current conduction path, connected in series across said charge storing means.

4. A circuit according to claim 1 wherein each said semiconductor element comprises an avalanche transistor.

5. A circuit according to claim 4 wherein said first electrode is the collector, said second electrode is the emitter, and said third electrode is the base.

6. A circuit according to claim 1 wherein each said semiconductor element comprises a silicon control rectifier.

7. A detector circuit comprising:

(a) at least two high power gain semiconductor elements each with an asymmetrical current conducting path therein between first and second electrodes thereof and having a third electrode responsive to an applied control signal for at least initiating current flow in said current conduction path;

(b) electric charge storing means connected in common between the said first electrode of each said semiconductor element and a circuit return path;

(c) a different bistable magnetic core element for each said semiconductor element having an inductively coupled first drive winding and a sense winding;

(d) means individually coupling said second electrode of each said semiconductor element as a second drive winding to a different said magnetic core element and also to said circuit return path; and (e) a charging circuit operatively connectable in selective fashion to said charge storing means for giving the latter an electric charge of a polarity and magnitude to thereby permit current conduction in the current conduction path of any said semiconductor element when a control signal is applied to its third electrode said electric charge changing to a magnitude insufficient to permit current conduction in any other semiconductor element once a control signal is applied to any one of said electrodes.

8. A circuit according to claim 7 wherein said charging circuit includes at least a potential source and a switch connected in series across said charge storing means.

9. A circuit according to claim 7 wherein said charging circuit includes at least a potential source and an impedance element, the latter being substantially larger than the impedance of any semiconductor element current conduction path, connected in series across said charge storing means.

10. A relative magnitude detecting circuit comprising:

(a) first means for storing bit values of a first binary word at different binary order locations thereof and including first and second output conductors therefrom;

(b) second means for sequentially interrogating all binary order locations of said first means, beginning with the most significant binary order location, with bit values in corresponding binary order positions of a second binary word, such that a first control signal appears on said first output conductor for each mismatch between a binary 1 in said first binary word and a binary 0 in said second binary word, and a second control signal appears on said second output conductor for each mismatch between a binary 0 in said first binary word and a binary 1 in said second binary word;

(c) two high power gain semiconductor elements each with an asymmetrical current conducting path therein between first and second electrodes thereof and having a third electrode responsive to an applied control signal for at least initiating current flow in said current conduction path;

(d) electric charge storing means connected in common between said first electrode of each said semiconductor element and a circuit return path;

(e) third means individually connecting the third electrode of each said semiconductor element to a different one of said first and second output conductors;

(f) fourth means connecting said electrode of each said semiconductor element with said circuit return path; and (g) a charging circuit operatively connectable in selective fashion to said charge storing means for giving the latter an electric charge of a polarity and magnitude to thereby permit current conduction in the current conduction path of any said semiconductor element when a control signal is applied to its third electrode.

11. A circuit according to claim 10 wherein said charging circuit includes at least a potential source and a switch connected in series across said charge storing means.

12. A circuit according to claim 10 wherein said charging circuit includes at least a potential source and an impedance of any semiconductor element current conduction path, connected in series across said charge storing means.

13. A circuit according to claim 10 wherein each said semiconductor element comprises an avalanche transistor.

14. A circuit according to claim 13 whereinsaid first electrode is the collector, said second electrode is the emitter, and said third electrode is the base.

15. A circuit according to claim 10 wherein each said semiconductor element comprises a silicon control rectifier.

16. A circuit according to claim 10 wherein is further included a different bistable magnetic core element for each said semiconductor element which in turn has its said second electrode coupled as a first drive winding with said core element, each said magnetic core element further having an individual second drive winding and an individual sense winding inductively coupled therewith.

References Cited

UNITED STATES PATENTS

| | | | |
|---|---|---|---|
| 2,172,050 | 9/1939 | Mayberry | 328—67 |
| 3,125,744 | 3/1964 | Olson | 340—174 |
| 3,143,659 | 8/1964 | Padalino | 307—88 |
| 3,267,441 | 8/1966 | Busch | 340—174 |

STANLEY M. URYNOWICZ, Jr., *Primary Examiner.*

B. L. HALEY, *Assistant Examiner.*

U.S. Cl. X.R.

307—88.5

UNITED STATES PATENT OFFICE
CERTIFICATE OF CORRECTION

Patent No. 3,427,601

February 11, 1969

Vincent J. Korkowski et al.

It is certified that error appears in the above identified patent and that said Letters Patent are hereby corrected as shown below:

Column 10, line 1, before "of" insert -- element, the latter being substantially larger than the impedance --.

Signed and sealed this 24th day of March 1970.

(SEAL)
Attest:

Edward M. Fletcher, Jr.
Attesting Officer

WILLIAM E. SCHUYLER, JR.
Commissioner of Patents